(12) United States Patent
Everard

(10) Patent No.: US 6,244,805 B1
(45) Date of Patent: Jun. 12, 2001

(54) SEALED GROMMET

(75) Inventor: Stephen M. Everard, Eau Claire, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/482,250

(22) Filed: Jan. 13, 2000

(51) Int. Cl.[7] .................................................. F16B 37/04
(52) U.S. Cl. ......................... 411/182; 411/369; 411/508; 411/900
(58) Field of Search ..................................... 411/182, 369, 411/371.1, 542, 900–903, 907, 508

(56) References Cited

U.S. PATENT DOCUMENTS

| 2,788,047 |   | 4/1957  | Rapata .        |
|-----------|---|---------|-----------------|
| 3,082,807 | * | 3/1963  | Tinnerman .     |
| 3,221,572 | * | 12/1965 | Swick .         |
| 3,534,797 |   | 10/1970 | Reinhard .      |
| 3,701,373 |   | 10/1972 | Wronke et al. . |
| 4,743,152 |   | 5/1988  | Nakayama et al. . |
| 4,818,164 | * | 4/1989  | Kazyak .        |
| 4,840,522 | * | 6/1989  | Kurihara .      |
| 4,948,314 |   | 8/1990  | Kurosaki .      |
| 4,971,500 |   | 11/1990 | Benoit et al. . |
| 5,165,833 | * | 11/1992 | Watanabe .      |
| 5,222,852 |   | 6/1993  | Snyder .        |
| 5,294,225 |   | 3/1994  | Kazino et al. . |
| 5,573,362 |   | 11/1996 | Asami et al. .  |
| 5,649,783 |   | 7/1997  | Ichikawa et al. . |
| 6,039,523 | * | 3/2000  | Kraus .         |

* cited by examiner

*Primary Examiner*—Flemming Saether
(74) *Attorney, Agent, or Firm*—Pitney, Hardin, Kipp & Szuch LLP

(57) ABSTRACT

A grommet is formed with elastomeric portions and relatively rigid portions by multi-shot core injection molding. The grommet. includes a head and a shank. The head includes a central planar area of the relatively rigid material, such as nylon. The head further includes a lower layer of elastomeric material, facing the shank, which serves as a seal or washer. The head further includes an upper layer of elastomeric material which includes countersunk portions around the blind aperture which is formed in the head and extends through a portion of the shank. The shank includes a rounded nose formed on a distal portion and has elastomeric material formed on an exterior thereof.

12 Claims, 5 Drawing Sheets

SEALED GROMMET

BACKGROUND OF THE INVENTION

1. Field of the Invention

This invention pertains to a grommet with an integrated elastomeric seal and nose cone to prevent water ingress. Multishot molding is typically used to form the grommet.

2. Description of the Prior Art

In the prior art, grommets frequently do not provide adequate sealing against moisture ingress. While a separate washer element is frequently used in conjunction with a grommet to provide for some sealing, this frequently does not provide for adequate sealing. This is additionally deficient in that the washer is a separate element thereby increasing installation expenses. Additionally, the packaging and shipping of a separate grommet and washer can be problematic in that the washer can become detached from the grommet in transit.

The locating of some prior art grommets in the panel cutouts has similarly been deficient.

Combination winged grommets and washers further have the deficiency of having a reduced pull-out retention.

Moreover, many prior art grommets, particularly in combination with separate washers, may lack an aesthetic appearance and further may have a screw point or tip protruding from the grommet which can cause a physical injury.

Some examples of prior art grommets include U.S. Pat. No. 5,294,225 entitled "Synthetic Resin Grommet" issued on Mar. 15, 1994 to Kazino et al.; U.S. Pat. No. 4,971,500 entitled "Enclosed Plastic Screw Grommet" issued on Nov. 20, 1990 to Benoit et al.; U.S. Pat. No. 4,948,314 entitled "Screw Fastener" issued on Aug. 14, 1990 to Kurosaki; and U.S. Pat. No. 3,701,373 entitled "Grommet Type Fastener" issued on Oct. 31, 1972 on Wronke et al.

OBJECTS AND SUMMARY OF THE INVENTION

It is therefore an object of this invention to provide a grommet which at least substantially reduces moisture ingress subsequent to installation.

It is therefore a further object of this invention to provide a grommet which does not require a separate washer element.

It is therefore a still further object of this invention to provide a grommet which has a high pull out retention.

It is therefore a still further object of this invention to provide a grommet which has increased aesthetics.

It is therefore a still further object of this invention to provide a grommet with reduced exposed sharp edges.

It is therefore a still further object of this invention to provide a grommet which can be easily located in a panel cutout.

It is therefore a further object of this invention to provide a grommet with reduced manufacturing, shipping and installation costs.

These and other objects are attained by providing a grommet with a nylon body with an integral elastomeric seal and nose cone formed thereon by multi-shot core injection molding. The integral washer provides full sealing against moisture ingress while eliminating a separate washer component. Similarly, the integral elastomeric nose cone surrounds and seals the screw aperture. However, an exposed nylon surface provides durability during insertion into a panel and rigid retention.

The exposed upper surface of the grommet has a countersunk-type structure to guide the screw during installation.

The use of core injection molded techniques eliminates assembly and subcontract processes, such as foam washer manufacture, thereby reducing production costs for the grommet.

BRIEF DESCRIPTION OF THE DRAWINGS

Further objects and advantages of the invention will become apparent from the following description and claims, and from the accompanying drawings, wherein:

FIG. is a side plan view, partially in phantom, of the grommet of the present invention.

Figure 2:
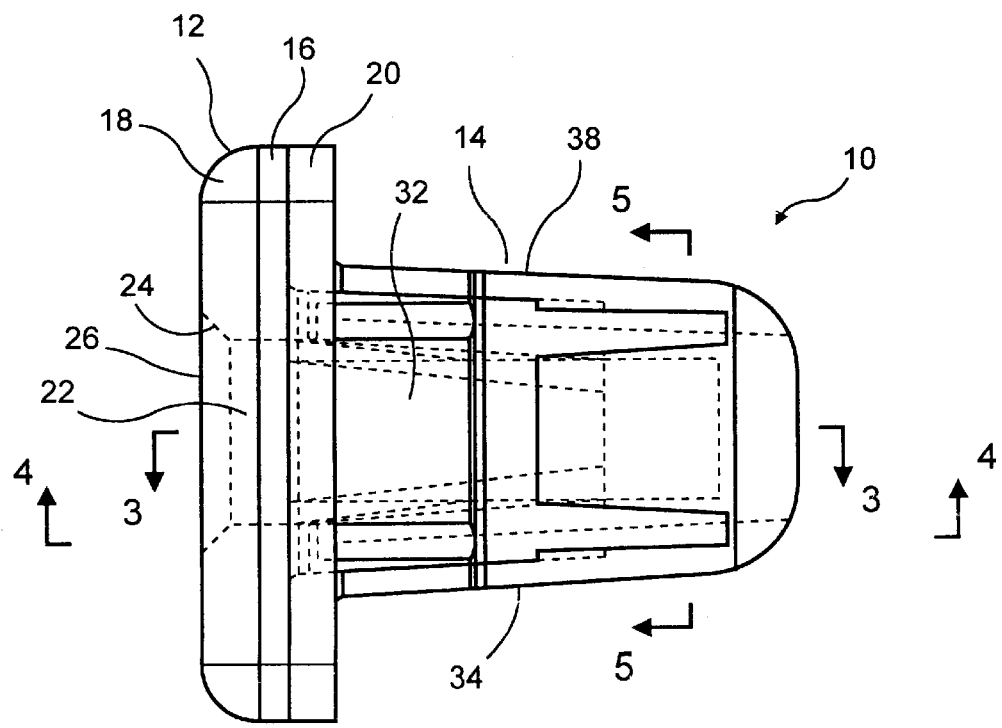
Figure 3:
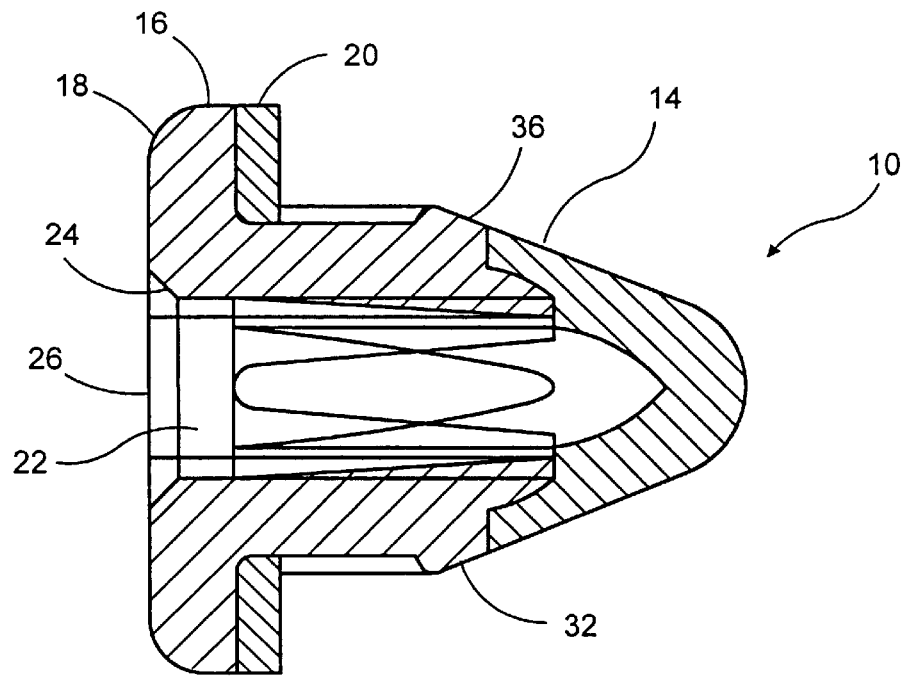

FIG. 3 is a cross-sectional view along plane 3—3 of FIG. 2 of the grommet the present invention.

Figure 4:
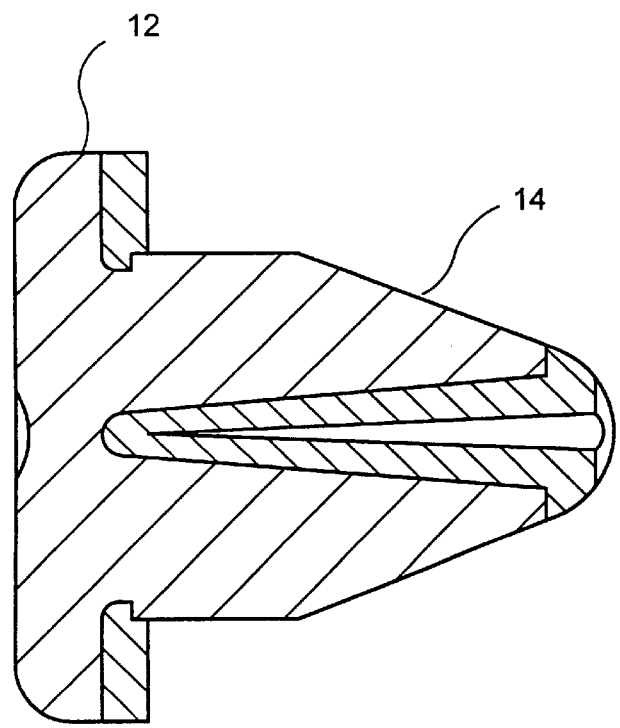

FIG. 4 a cross-sectional view along plane 4—4 of FIG. 2 of the grommet he present invention.

Figure 5:
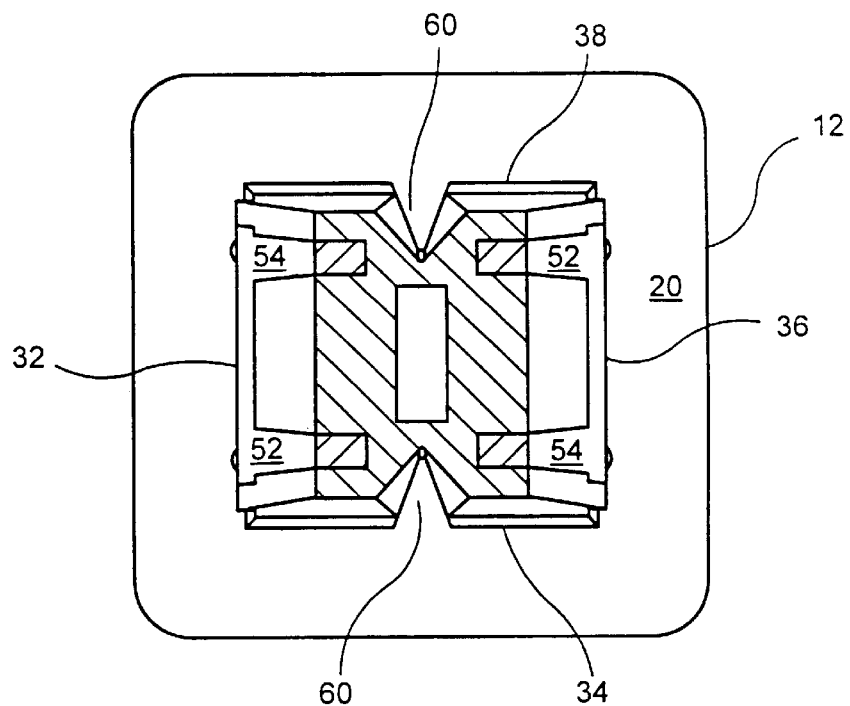

FIG. 5 is a cross-sectional view along plane 5—5 of FIG. 2 of the grommet of the present invention.

Figure 6:
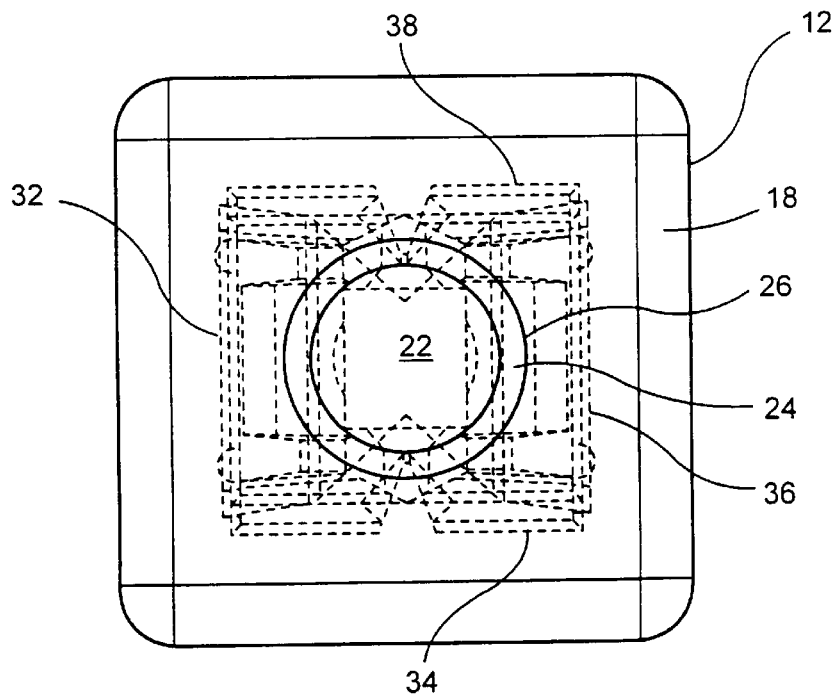

FIG. 6 is a top plan view, partially in phantom, of the grommet of the present invention.

Figure 7:
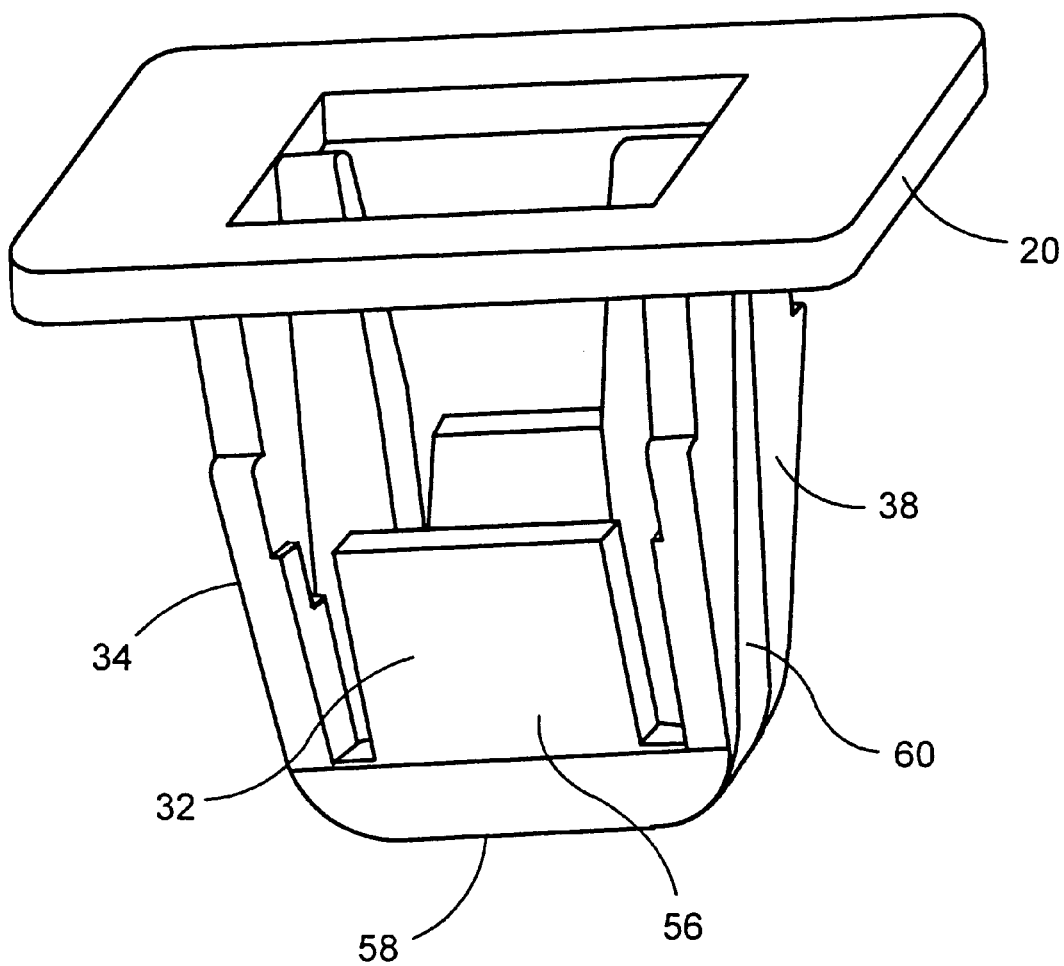

FIG. 7 is a perspective view of the elastomeric portion of the grommet of the present invention, excluding the upper plate.

Figure 8:
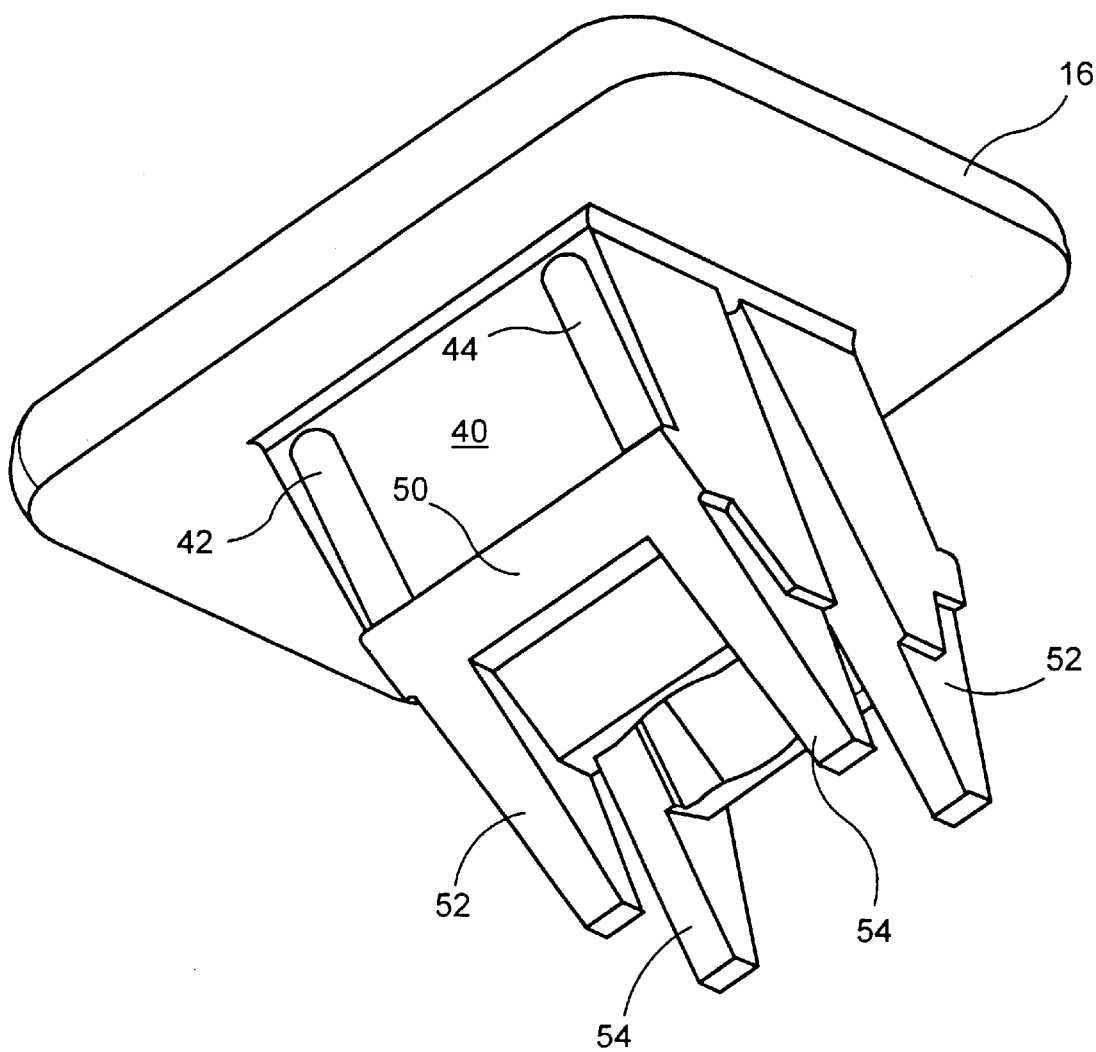

FIG. 8 is a perspective view of the relatively rigid nylon portion of the grommet of the present invention.

DETAILED DESCRIPTION OF THE PREFERRED EMBODIMENT

Figure 1:
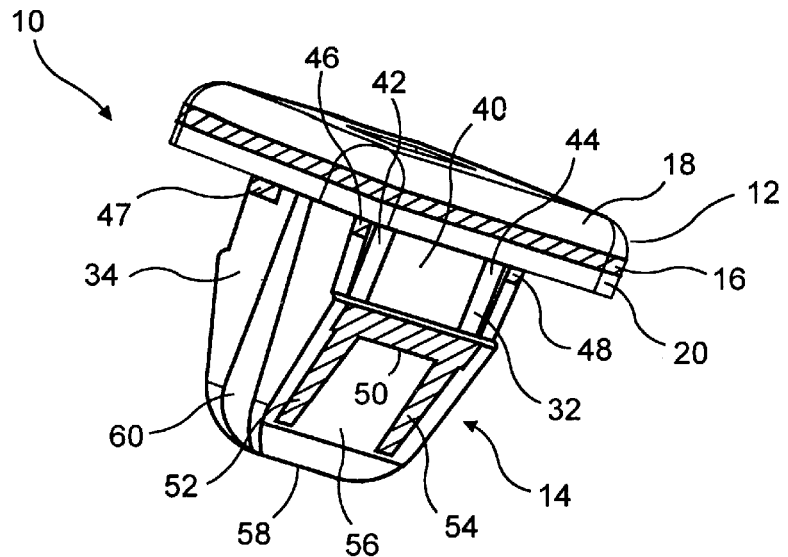
FIG. 1 a perspective view of the grommet of the present invention, with cross-hatching in the exposed relatively rigid nylon portions.

Referring now to the drawings in detail wherein like numerals indicate like elements throughout the several views, one sees that FIG. 1 is a perspective view of grommet 10 of the present invention. Grommet 10 is comprised of planar head 12 and rounded shank 14. Planar head 12 is comprised of a central planar nylon support portion 16, an upper elastomeric plate 18, and a lower elastomeric seal 20. Elastomeric seal 20 is integrally formed and configured to sealingly abut about the periphery of a square aperture in panel (not shown). The elastomeric material used for the various elastomeric portions is preferably santoprene, although those skilled in the art will recognize that other materials are equally acceptable. As can be seen from FIGS. 2, 3, and 6, blind aperture 22 is formed through planar head 12 and extends through shank 14. Additionally, upper elastomeric plate 18 includes countersunk portions 24 about mouth 26 of blind aperture 22 to guide the screw during installation.

As shown in FIGS. 1 and 5, rounded shank 14 is configured to be engaged within a square aperture of a panel. Rounded shank 14 has a generally square cross section as formed by walls 30, 32, 34, 36 as it joins head 12. Wall 32 has exposed rigid nylon at exposed upper face 40 with longitudinal ribs 42, 44 and upper corners 46, 48 formed at the junction with head 12. Upper face 40 further includes a lower transverse rib 50 from which downwardly extending prongs 52, 54 extend, all of exposed rigid nylon. Wall 32 further includes distal rounded nose portion 56 formed of elastomeric material between downwardly extending prongs 52, 54 and extending to tip 58. Corresponding symmetric structures are found on wall 36.

Wall 34 is formed of elastomeric material except for upper corners 46, 47 formed at the junction with head 12. Wall 34 includes longitudinal notch 60 which extends from the junction with head 12 down to tip 58. Corresponding symmetric structures are found on wall 38.

Grommet 10 is typically formed by multi-shot core injection molding. That is, typically the rigid nylon portion (see FIG. 8) is core injection molded first and then the elastomeric portion (see FIG. 7) is core injection molded about the rigid nylon portion. The elastomer bonds to the rigid nylon portion forming grommet 10.

To install grommet 10, the user inserts tip 58 through a square aperture in a panel to be joined (not shown). The grommet is further inserted so that elastomer seal 20 abuts against the periphery of the square aperture of the panel to be sealed. The user then inserts a screw (not shown) into blind aperture 22 and threadably drives the screw. The screw thereby expands shank 14 so that shank 14 is secure within the square aperture. Furthermore, exposed nylon corners 46, 47, 48 (and a fourth nylon corner) abut the corresponding corners of the square aperture so that excessive wear to the elastomeric material is avoided.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A grommet comprised of an elastomeric material and a relatively rigid material integrally bonded thereto, the grommet comprising:

a relatively planar head with a first side and a second side;

a shank including a proximal end and a distal end, said proximal end extending from said second side of said planar head;

an aperture with a mouth formed on said planar head, said aperture extending into said shank;

said planar head comprising a first layer of the relatively rigid material and a second layer of the elastomeric material, said second layer formed on said second side; and said proximal end of said shank including exposed surfaces of the relatively rigid material and said distal end of said shank including an integral tip formed of the elastomeric material surrounding and sealing said aperture.

2. The grommet of claim 1 wherein said grommet is formed by a multi-shot core injection molding process.

3. The grommet of claim 1 wherein the relatively rigid material is nylon.

4. The grommet of claim 1 wherein the elastomeric material is santoprene.

5. A grommet comprised of an elastomeric material and a relatively rigid material integrally bonded thereto, the grommet comprising:

a relatively planar head with a first side and a second side;

a shank including a proximal end and a distal end, said proximal end extending from said second side of said planar head;

an aperture with a mouth formed on said planar head, said aperture extending into said shank;

said planar head comprising a first layer of the relatively rigid material and a second layer of the elastomeric material, said second layer formed on said second side;

said proximal end of said shank including exposed surfaces of the relatively rigid material and said distal end of said shank including a tip formed of the elastomeric material; and further including a third layer formed on said first side of said planar head and adjoining said first layer of the relatively rigid material, said third layer being comprised of the elastomeric material.

6. The grommet of claim 5 wherein a mouth of said aperture is formed on said third layer, and countersunk portions are formed about a periphery of said aperture.

7. The grommet of claim 6 wherein said aperture is a blind aperture.

8. The grommet of claim 7 wherein said proximal end of said shank has a substantially square cross section.

9. The grommet of claim 8 wherein corners of said shank at said proximal end are formed of the relatively rigid material.

10. The grommet of claim 9 wherein said distal end of said shank is relatively rounded.

11. The grommet of claim 10 further including exposed surfaces of elastomeric material on a portion of said shank.

12. The grommet of claim 11 wherein at least one longitudinal groove is formed on said exposed surfaces of the elastomeric material.

* * * * *